(12) United States Patent
Willard et al.

(10) Patent No.: US 8,655,209 B2
(45) Date of Patent: Feb. 18, 2014

(54) CORRECTION OF LINE WIDTH VARIATION DUE TO TONER AGE

(75) Inventors: W. Bradford Willard, Fairport, NY (US); Paul L. Jacobs, Webster, NY (US); Brian Robert Conrow, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 315 days.

(21) Appl. No.: 13/171,544

(22) Filed: Jun. 29, 2011

(65) Prior Publication Data

US 2013/0002788 A1 Jan. 3, 2013

(51) Int. Cl.
*G03G 15/00* (2006.01)

(52) U.S. Cl.
USPC .............................. 399/51; 347/224; 382/258

(58) Field of Classification Search
CPC .................................. B41J 2/435; G03G 15/00
USPC .............................. 347/224; 382/258; 399/51
See application file for complete search history.

(56) References Cited

U.S. PATENT DOCUMENTS

| | | | | |
|---|---|---|---|---|
| 4,310,237 A | * | 1/1982 | Gengelbach | 399/138 |
| 4,544,264 A | * | 10/1985 | Bassetti et al. | 347/129 |
| 5,250,988 A | * | 10/1993 | Matsuura et al. | 399/42 |
| 5,339,150 A | * | 8/1994 | Hubble et al. | 399/49 |
| 6,288,733 B1 | * | 9/2001 | Nakazawa et al. | 347/133 |
| 6,697,582 B1 | * | 2/2004 | Scheuer | 399/49 |
| 7,064,862 B2 | * | 6/2006 | Takashimizu | 358/1.9 |
| 7,414,759 B2 | * | 8/2008 | Kellie et al. | 358/474 |
| 7,826,757 B2 | * | 11/2010 | Akita | 399/51 |
| 7,948,658 B2 | * | 5/2011 | Conrow et al. | 358/3.06 |
| 8,041,241 B2 | * | 10/2011 | Kawasaki et al. | 399/51 |
| 8,174,551 B2 | * | 5/2012 | Morita | 347/224 |
| 2006/0285764 A1 | | 12/2006 | Xu et al. | |
| 2011/0279835 A1 | * | 11/2011 | Tanaka | 358/1.9 |

FOREIGN PATENT DOCUMENTS

JP  2000-238341  *  2/1999  .................. B41J 2/52

OTHER PUBLICATIONS

Husrev Taha Sencar et al.; Intelligent Multimedia Analysis for Security Applications; 2010 Springer-Verlag Berlin Heidelberg; p. 358.*

* cited by examiner

*Primary Examiner* — Clayton E LaBalle
*Assistant Examiner* — Kevin Butler
(74) *Attorney, Agent, or Firm* — Fay Sharpe LLP

(57) ABSTRACT

The present disclosure provides a method of forming a toner image, comprising: electrically charging a photoreceptor by a charging roller being brought into contact with the photoreceptor, the photoreceptor comprises a photosensitive coating layer on a cylindrical conductive substrate; correcting line width variation using an exposure adjustment calculation (y); and, wherein the exposure adjustment calculation uses a factor based on a ratio (m) of a coefficient of line width variation due to toner age divided by the coefficient of line width variation due to laser power.

13 Claims, 3 Drawing Sheets

CORRECTION OF LINE WIDTH VARIATION DUE TO TONER AGE

BACKGROUND

In printing systems, line width is a critical customer image quality attribute as it relates to text quality. The ability to set and maintain line width is desirable. In some control systems, line width variation in the presence of system noises is controlled by setting exposure and cleaning field in response to ETAC sensor readings of a halftone patch. The correlation of line width to halftone patch readings is reasonable but not completely accurate. In system testing, line width variation has a significant residual as toner age varies, for example, from 10 min to 120 min.

To be described in more detail hereinafter, aspects of the present disclosure and embodiments thereof include methods and systems for adjusting aspects of images. For example, methods and systems may be employed to control line width in image objects, such as, for example, text and line art. Embodiments will be described with reference to line width adjustments and laser power adjustments. However, embodiments may be applied to the adjustment of other aspects of image objects.

It should be noted that the term line, or lines, is meant to refer herein to any relatively thin image object, including, but not limited to, curves and circles.

Many images include thin lines. For example, the characters of text are considered to be made up of thin lines and curves. Additionally, many business forms include lines and grids for separating portions of a document. Many drawings are made up of discreet thin lines. It is desirable to be able to adjust images in order to enhance or improve their appearance. For instance, it may be desirable to adjust the width or thickness of lines in an image.

For example, one way to adjust the darkness or lightness or enhance the contrast of a document being printed or photocopied is to adjust the width or thickness of lines. Additionally, it may be desirable to adjust the width of lines in an image in order to compensate for a drift or imperfection in an image rendering system. For instance, ink or toner may spread or be absorbed by a print media more or less readily than anticipated. If an ink spreads more readily than an ideal or anticipated amount, then, for example, a white line or feature printed on a black, gray or colored background, might appear thinner than desired or may be completely filled in by spreading colorant from neighboring portions of an image. If ink or toner or other colorant spreads less readily than anticipated, then a black, gray or colored line may appear thinner than desired.

Line widths can also vary in association with the aging of toner in the housing. Line width variations can have a significant residual as toner age varies from, for example, 10 minutes to 120 minutes. The present disclosure proposes correcting for line width variation versus toner age using a model of line width versus exposure or laser power to determine an exposure correction value for a nominal exposure setting.

U.S. Patent Application Publication US20060285764 to Beilei, et al. published Dec. 21, 2006, entitled Model-based line width control, discusses methods for controlling the width of lines in an image in order to compensate for drift or imperfections in an image rendering system. For instance, ink or toner may spread or be absorbed by a print media more or less readily than anticipated. The disclosure of the above cited patent application is incorporated herein by reference.

There has been a desire for line width control techniques with reduced system storage requirements. Additionally, there has been a desire for line width control techniques that do not require, or require fewer, data lookups and comparisons. Further, there is a desire for line width control methods that can be efficiently adapted to related applications, thereby greatly reducing the design effort.

BRIEF DESCRIPTION

The present disclosure provides a method of forming a toner image, comprising: electrically charging a photoreceptor by a charging roller being brought into contact with the photoreceptor, the photoreceptor comprises a photosensitive coating layer on a cylindrical conductive substrate; correcting line width variation using an exposure adjustment calculation (y); and, wherein the exposure adjustment calculation uses a factor based on a ratio (m) of a coefficient of line width variation due to toner age divided by the coefficient of line width variation due to laser power.

The present disclosure further provides a method of forming a toner image, comprising: electrically charging a photoreceptor by a charging roller being brought into contact with the photoreceptor, the photoreceptor comprises a photosensitive coating layer on a cylindrical conductive substrate; correcting line width variation using an exposure adjustment calculation; wherein the exposure adjustment calculation is based on toner age. The method further comprises the toner age includes a mean residence time of toner in a toner housing cartridge.

The present disclosure still further provides a method of forming a toner image, comprising: electrically charging a photoreceptor by a charging roller being brought into contact with the photoreceptor, the photoreceptor comprises a photosensitive coating layer on a cylindrical conductive substrate; correcting line width variation using an exposure adjustment calculation (y); wherein the exposure adjustment calculation uses a factor based on a ratio (m) of a coefficient of line width variation due to toner ager divided by a coefficient of line width variation due to laser power; and, wherein the exposure adjustment calculation adjusts the laser power based on the toner age including a rate of toner usage.

And still even further, the present application provides a method of forming a toner image, comprising: electrically charging a photoreceptor by a charging roller being brought into contact with the photoreceptor, the photoreceptor comprises a photosensitive coating layer on a cylindrical conductive substrate; correcting line width variation using an exposure adjustment calculation; and, wherein the exposure adjustment calculation is based on toner age. The toner age (TA) can be based on the following: $TA = c + e^{-delta(t)/c} \times (A_0 - c)$; wherein c is an aging time constant and wherein the aging time constant is the time required to remove one sump mass worth of toner; delta(t) is the change in time; and, $A_0$ is the initial toner age.

DETAILED DESCRIPTION

Figure 1:
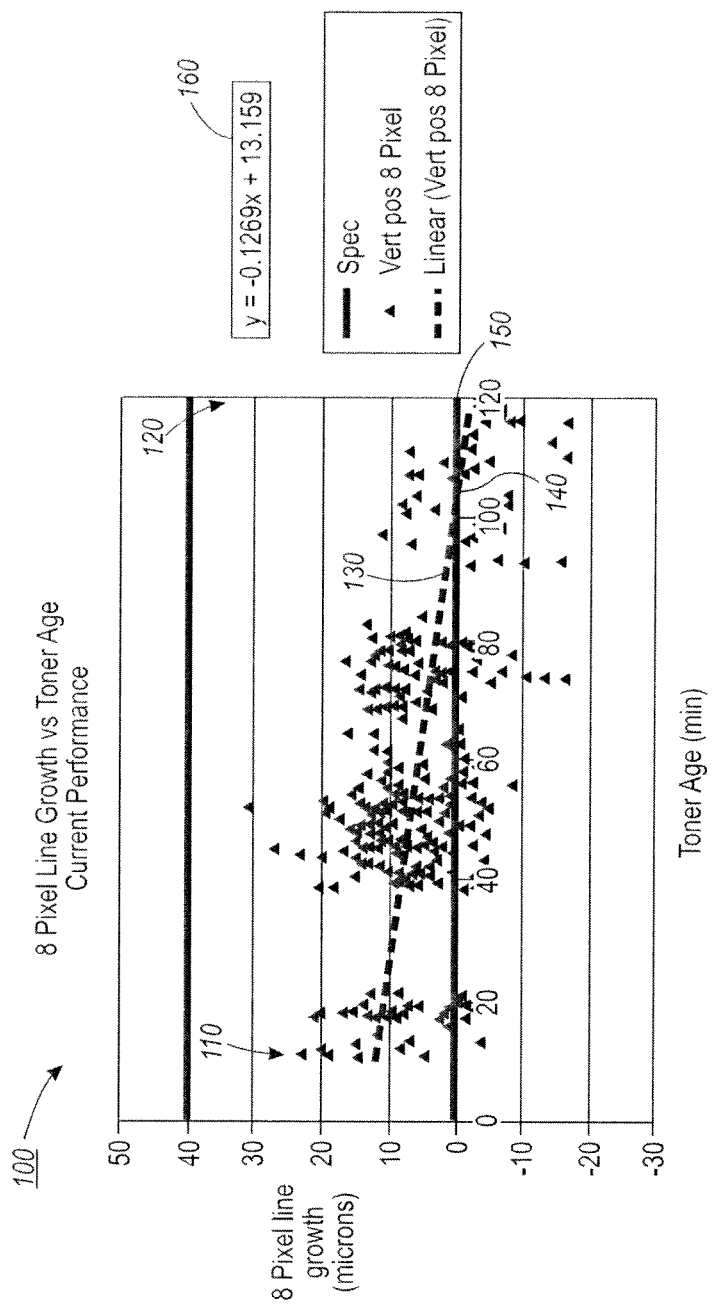
FIG. 1 is a scatter diagram of line growth as it relates to toner age.

In printing systems, line width is a critical customer image quality attribute as it relates to text quality. The ability to set and maintain line width is desirable. In some control systems, line width variation in the presence of system noises is controlled by setting exposure and cleaning field in response to ETAC sensor readings of a halftone patch. The correlation of line width to halftone patch readings is reasonable but not completely accurate. In system testing, line width variation has a significant residual as toner age (TA) varies 100, for example, from 10 min. 110 to 120 min. 120 as shown in the scatter diagram of FIG. 1. As shown, there is a negative line growth (i.e. negative slope) trend 130 as the toner ages and can result in a line width outside of a specified range. See for example, the line width 140 trending below the specified minimum 150 at about 105 minutes in FIG. 1. The equation 160 for trend line 130 as shown in FIG. 1 is: y=−0.1269x+ 13.159. The negative slope of −0.1269 reflects the negative correlation such that the line width decreases as the toner age increases.

The present disclosure describes a method to reduce the effect of toner age on line width (i.e. 8 pixel line width) by adjusting the laser power. To be described in more detail hereinafter, a formula is provided for adjusting the laser power based on toner age as calculated as a function of the rate of toner usage.

A nominal exposure can be set via the current controls system setpoint, and an additional adjustment to the exposure can be calculated based on a DOE based line width exposure model developed at a predeterminable setting, for example 45 minutes, for toner age. Exposure adjustment calculations can then be made based on the following equation:

$$y=m(TA-45)$$

where TA=toner age and m is determined by the ratio of the coefficient of line width variation due to toner age over the coefficient of line width variation due to laser power.

Figure 2:
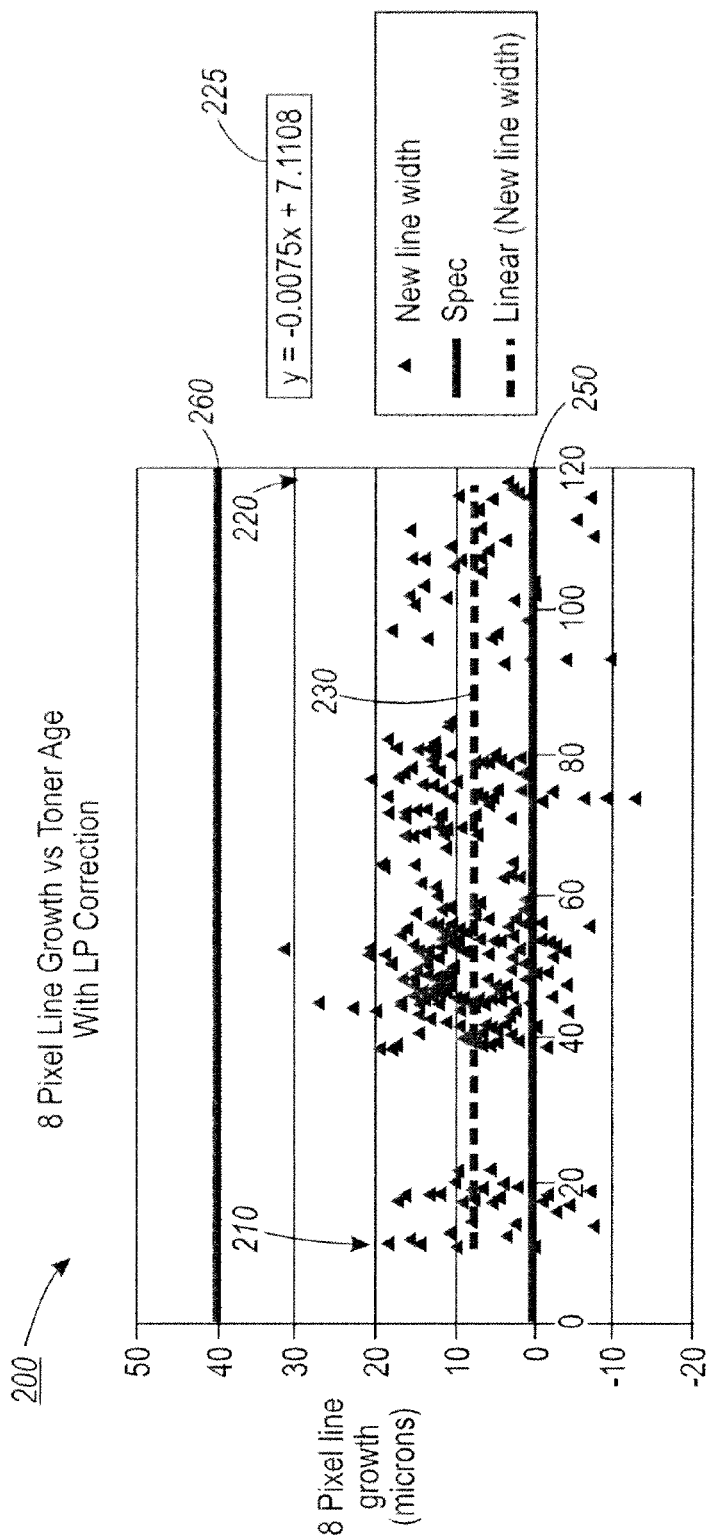
FIG. 2 is a scatter diagram of line growth as it relates to toner age as affected by laser power correction; and, FIG. 3 displays a graphical representation of a toner age calculation based on an exemplary print rate.
Figure 3:
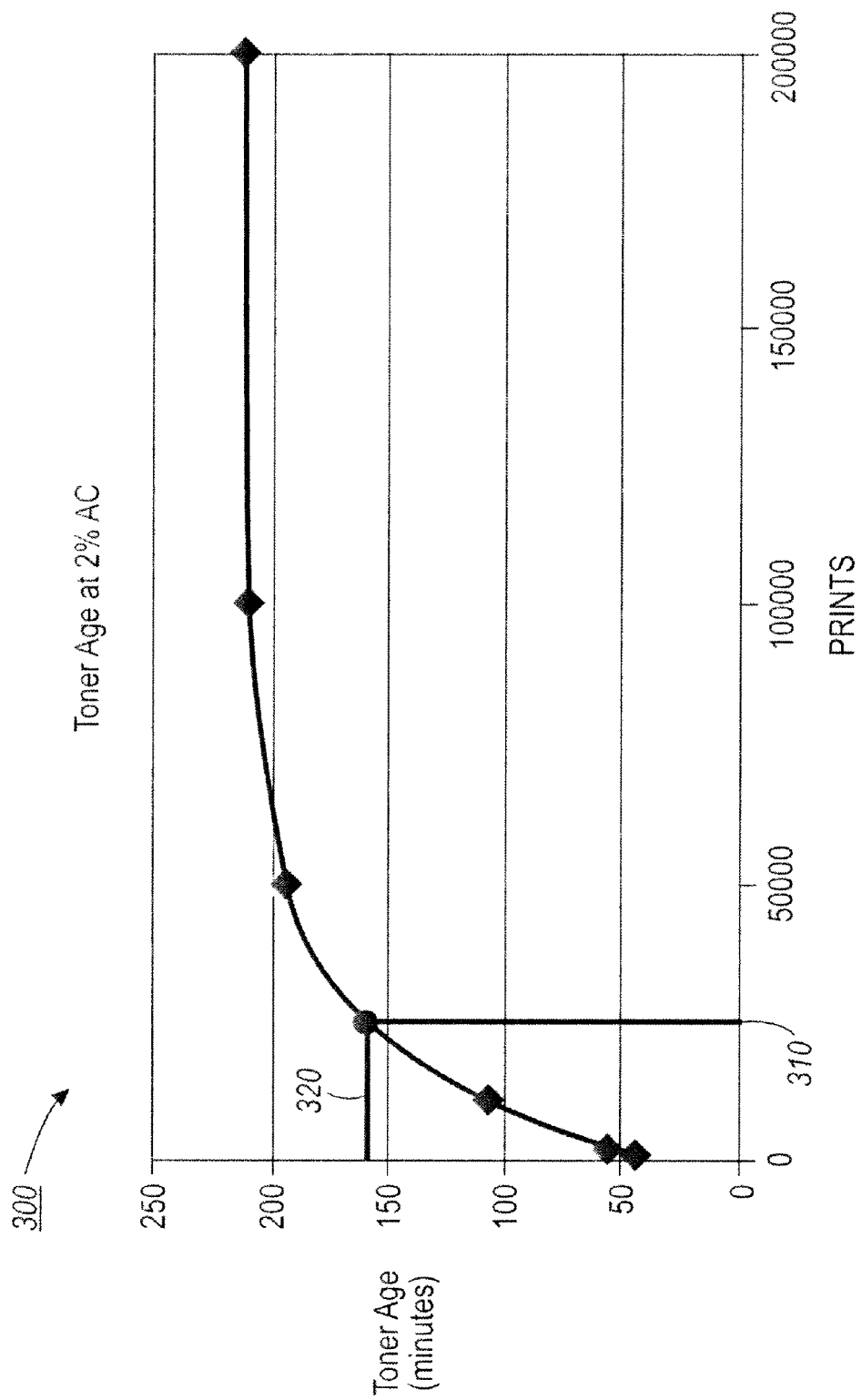

Referring now the FIG. 2 and Table 1, wherein the simulated improvement in line width variation 200, reflecting the laser power correction, is reflected in the results. The equation 225 of line 230 includes a slope of nearly zero (i.e. 0.0075) which represents a consistent line width as the toner ages from 10 min. 210 to 120 min. 220. The diagram of FIG. 2, correlation coefficient (R) of 0.9750 ($R^2$=0.9506) of the scatter, demonstrates the improved line width variation, or lack thereof. In addition, the line width can be maintained with a specified range between zero 250 and forty 260 microns.

TABLE 1

| | Y-hat Model | K 8pxl V | |
|---|---|---|---|
| Factor | Name | Coeff | P(2 tail) |
| Const | | 50.501 | 0.0224 |
| A | Laser Power | 11.196 | 0.0000 |
| B | Vmc | −0.36333 | 0.0000 |
| C | VwdAC | 0.21511 | 0.0000 |
| D | GAP | −0.26650 | 0.0000 |
| E | P/Rv6.0 | −0.42480 | 0.0000 |
| F | Tribo | | |
| | $R^2$ | 0.9506 | |
| | Adj $R^2$ | 0.9479 | |
| | Std Error | 6.7243 | |
| | F | 342.7355 | |

One element of the present disclosure includes implementing a digital Toner Reproduction Curve (TRC) control. Since the laser power adjustment can alter the native TRC rendered by a xerographic engine, or other corresponding engine, a corresponding digital TRC adjustment can be incorporated to compensate for the altering of the native TRC. One of the beneficial results of the present disclosure is a more stable line width in the presence of system noises.

One form of the adjustment equation is as follows:

$$TA=c+e^{-delta(t)/c} \times (A_0-c); \text{ wherein}$$

Toner Age=mean residence time of the toner in the housing;
Delta (t)=change in time;
$A_0$=initial toner age; and,
c=aging time constant, for example the time required to remove one (1) sump mass worth of toner, or one (1) sump turn of the developer housing.

The aging time constant (c) also defines the asymptotic toner age for a given throughput rate. One example calculation can be as follows using the data table below:

| DMA Target: | 0.00048 | gm/cm$^2$ | |
|---|---|---|---|
| Paper Size.: | 767.7404 | cm$^2$ | 8½ × 14 sheet |
| Carrier sump mass: | 3450 | gm | |

Aging time constraint calculation in prints, using for example, a 2% area coverage document and TC of 4.5 pph $$c = \frac{\text{mass of toner in the sump}}{\text{mass of toner removed per print}}$$

$$= \frac{3450 \times (4.5/100)}{0.00048 \times 767.74 \times (2/100)}$$

$$= 21064 \text{ prints}$$

Aging time constraint calculation in minutes, assuming 100 prints/min $$c = \frac{21064 \text{ prints}}{100 \text{ prints/min}} = 210.6 \text{ min}$$

At 2% area coverage and based on the calculation above, it will take 210.6 min to make one sump turn. Also, the asymptotic toner age at 2% area coverage will be 210.6 minutes The toner age calculation 300 (at 2% ac) can utilize a predeterminable starting toner age (i.e. nominal toner age) of for example, 45 min, and a print rate of 100 ppm for 25000 prints 310, wherein the calculation for toner age then becomes:

$$\text{Toner age}=210.6+e^{-(25000/100)/210.6}(45-210.6)=160.07 \text{ min}$$

The toner age calculation implies that the percent of old toner removed in 1 sump $$1 - \frac{1}{e} \cong 63\%;$$

and for 3 sump turns, $$1 - \frac{1}{e^3} \cong 95\%.$$

One operational assumption, in the above calculation, involves the removal of new and old toner in a somewhat uniform distribution. Since development is size and charge selective, this is not entirely accurate. The present disclosure adds no cost to the machine and improves image quality. The improved image quality would improve the customer perception of value received. There seems to be no prior use of the length of time the toner is in the sump. This feature can be implemented in firmware programming.

The proposed method above reduces the effect of toner age on line width by adjusting the laser power. The formula detailed above provides for an adjustment to the laser power based on toner age as calculated as function of the rate of toner usage. Performing these calculations can require fewer system resources than performing line width control via template matching techniques, or other techniques.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of forming a toner image, comprising:
electrically charging a photoreceptor by a charging roller being brought into contact with the photoreceptor, the photoreceptor comprises a photosensitive coating layer on a cylindrical conductive substrate;
correcting line width variation using an exposure adjustment calculation (y);
wherein the exposure adjustment calculation uses a factor based on a ratio (m) of a coefficient of line width variation due to toner age divided by the coefficient of line width variation due to laser power; and,
wherein the exposure adjustment calculation (y) is based on the following calculation:

$y=m$(toner age min.−45 min.); wherein $m$ is the ratio.

2. The method of claim 1, wherein the exposure adjustment calculation adjusts the laser power based on the toner age including a rate of toner usage.

3. A method of forming a toner image, comprising:
electrically charging a photoreceptor by a charging roller being brought into contact with the photoreceptor, the photoreceptor comprises a photosensitive coating layer on a cylindrical conductive substrate;
correcting line width variation using an exposure adjustment calculation;
wherein the exposure adjustment calculation is based on toner age; and,
the toner age includes a mean residence time of toner in a toner housing cartridge.

4. A method of forming a toner image, comprising:
electrically charging a photoreceptor by a charging roller being brought into contact with the photoreceptor, the photoreceptor comprises a photosensitive coating layer on a cylindrical conductive substrate;
correcting line width variation using an exposure adjustment calculation;
wherein the exposure adjustment calculation is based on toner age; and, the toner age includes a mean residence time of toner in a toner housing cartridge;
wherein the toner age (TA) is based on the following:

$TA=c+e^{-delta(t)/c} \times (A_0-c)$;

wherein c is an aging time constant wherein the aging time constant is the time required to remove one sump mass worth of toner;
delta(t) is the change in time; and,
$A_0$ is the initial toner age.

5. The method of claim 4, wherein the aging time constant (c) is based on a mass of toner in a sump divided by a mass of toner removed per print.

6. The method of claim 5, further comprising a removal of toner with each turn of the sump wherein a percent of toner removed with the each turn of the sump is:

$1-(1/e)$.

7. The method of claim 5, further comprising a removal of toner with each turn of the sump wherein the percent of toner removed with three sump turns is:

$1-(1/e^3)$.

8. A method of forming a toner image, comprising:
electrically charging a photoreceptor by a charging roller being brought into contact with the photoreceptor, the photoreceptor comprises a photosensitive coating layer on a cylindrical conductive substrate;
correcting line width variation using an exposure adjustment calculation (y);
wherein the exposure adjustment calculation uses a factor based on a ratio (m) of a coefficient of line width variation due to toner age divided by a coefficient of line width variation due to laser power; and,
wherein the exposure adjustment calculation adjusts the laser power based on the toner age including a rate of toner usage.

9. The method of claim 8, wherein the exposure adjustment calculation (y) is based on the following calculation:

$y=m$(toner age min.−45 min.); wherein $m$ is the ratio.

10. A method of forming a toner image, comprising:
electrically charging a photoreceptor by a charging roller being brought into contact with the photoreceptor, the photoreceptor comprises a photosensitive coating layer on a cylindrical conductive substrate;
correcting line width variation using an exposure adjustment calculation;
wherein the exposure adjustment calculation is based on toner age; and,
wherein the toner age (TA) is based on the following:

$TA=c+e^{-delta(t)/c} \times (A_0-c)$;

wherein c is an aging time constant wherein the aging time constant is the time required to remove one sump mass worth of toner;
delta(t) is the change in time; and,
$A_0$ is the initial toner age.

11. The method of claim 10, wherein the aging time constant (c) is based on a mass of toner in a sump divided by a mass of toner removed per print.

12. The method of claim 11, further comprising a removal of toner with each turn of the sump wherein the percent of toner removed with the each turn of the sumps is:

$1-(1/e)$.

13. The method of claim 11, further comprising a removal of toner with each turn of the sump wherein the percent of toner removed with three sump turns is:

$1-(1/e^3)$.

* * * * *